(12) United States Patent
Olausson

(10) Patent No.: US 6,467,436 B1
(45) Date of Patent: Oct. 22, 2002

(54) PET COLLAR DEVICE

(76) Inventor: Kurt L. Olausson, Skogsvagen 4, Kungsbacka (SE), 43491

( * ) Notice: Subject to any disclaimer, the term of this patent is extended or adjusted under 35 U.S.C. 154(b) by 0 days.

(21) Appl. No.: 09/709,149

(22) Filed: Nov. 10, 2000

(51) Int. Cl.[7] .............................................. A01K 27/00
(52) U.S. Cl. ........................ 119/792; 119/793; 119/803
(58) Field of Search ................... 119/792, 793, 119/863, 864, 776, 803; 294/119.2, 19.1; 49/461; 56/332

(56) References Cited

U.S. PATENT DOCUMENTS

| | | | |
|---|---|---|---|
| 1,257,634 A | * | 2/1918 | Perrin ........................ 119/803 |
| 2,168,132 A | | 8/1939 | Marshall |
| 2,289,802 A | * | 7/1942 | Norton ........................ 119/793 |
| 2,458,489 A | * | 1/1949 | Hallander .................... 119/793 |
| 4,019,463 A | * | 4/1977 | Kitchen ....................... 119/793 |
| 4,519,643 A | * | 5/1985 | Harris ...................... 114/221 R |
| 4,599,074 A | | 7/1986 | Beckly |
| 4,682,716 A | * | 7/1987 | Morellini ....................... 222/1 |
| 4,974,549 A | * | 12/1990 | Gordon ....................... 119/793 |
| 5,009,214 A | * | 4/1991 | Wilde ....................... 124/35.2 |
| 5,129,363 A | | 7/1992 | Ricketts |
| 5,317,989 A | * | 6/1994 | Swanson et al. ............ 119/792 |
| 5,611,298 A | * | 3/1997 | Sporn ......................... 119/792 |
| 6,006,699 A | * | 12/1999 | Keever ....................... 119/795 |
| 6,012,416 A | * | 1/2000 | Lammers .................... 119/803 |

FOREIGN PATENT DOCUMENTS

| | | | |
|---|---|---|---|
| EP | 0060100 A1 | * | 9/1982 |
| FR | 2442584 A | * | 8/1980 |

* cited by examiner

Primary Examiner—Charles T. Jordan
Assistant Examiner—John W. Zerr
(74) Attorney, Agent, or Firm—Kenneth S. Watkins, Jr.

(57) ABSTRACT

A pet collar device (100) incorporates a body (117) and a reciprocating plunger (109) extending through the body. A flexible band (101), attached to one end of the plunger, extends from the body when a knob (111) of the plunger is depressed by a palm or thumb of a hand and the fingers of the same hand engage finger grips (123) on the body. The extended band allows placement over the head of a pet. Release of the plunger by the hand allows a bias spring (127) to bias the plunger in the opposite direction, retracting the flexible band into the body and securing the collar device about the neck of the animal. The collar device allows quick and simple one-handed engagement of the collar device on the animal.

20 Claims, 4 Drawing Sheets

PET COLLAR DEVICE

FIELD OF THE INVENTION

The present invention relates to pet collars and, more particularly, to pet collars for use with leashes.

BACKGROUND OF THE INVENTION

Many pet owners find themselves faced with pet restraint issues, including frequent need to maintain physical control of the pet during exercise, leisure and housekeeping chores. A necessary step for pet restraint is attaching a pet collar and leash or, alternatively, connecting a leash to a collar maintained on the pet. Either of these methods is an inconvenient, or even difficult evolution since it often requires pet restraint while fumbling with small attachment devices such as buckles, snaps or clips. Even if the animal remains calm, attaching small fasteners utilized on conventional collars and leashes requires two hands and good vision. This evolution is especially difficult if one hand is needed for support, or if the owner is a elderly or physically or visually impaired.

Various improvements on the collar and leash have been disclosed to address some of these limitations. For example, U.S. Pat. No. 5,129,363 discloses a leash apparatus having an elongate body with an actuator rod. A handle is fitted on one end and a strap on the other. The strap forms an adjustable noose to secure and animal. The device aids those of diminished physical capability to secure the strap about the animal's head.

U.S. Pat. No. 5,317,989 discloses an adjustable animal collar and leash which includes a wide flexible collar member attached to "D" rings and a flexible strap member looped through the "D" rings to provide an adjustable collar opening. The other end of the leash strap member is folded and sewn to form a loop handle.

The large size and requirement for two-handed operation limits the effectiveness of these devices. A need exists for an improved collar device that addresses the limitations of presently available collars and leashes for pets.

OBJECTS AND SUMMARY OF THE INVENTION

Therefore an object of the present invention is to provide a collar device that can be quickly and easily secured about the neck of a pet with one hand.

Another object of the present invention is to provide a collar device that can be used with a conventional leash.

Another object of the present invention is to provide a collar device that is small and light, reducing strain on the animal and it's owner. Still another object of the present invention is to provide a collar device that can be used with different sized animals.

Another object of the present invention is to provide a collar device that can be used by elderly or physically or visually impaired pet owners.

Yet another object of the present invention is to provide a collar that is simple and low in cost.

The pet collar device of the present invention comprises a plunger reciprocally mounted in a body or housing. The end portions of a flexible band are attached to the distal end of the plunger inside the body forming a loop of the flexible strap extending from the distal end of the body. The palm or thumb of the hand engages a knob attached to the proximate end of the plunger extending from the proximate end of the body, and the fingers of the same hand engage finger grips on the body of the device. Constricting the hand muscles propels the plunger and end portions of the strap towards the distal end of the body to extend the strap from the body, enlarging the loop and allowing placement of the loop over the head of the pet. Releasing the plunger allows a bias element such as a spring to bias the plunger in the opposite direction, retracting the end portions of the strap towards the proximate end of the body and reducing the loop diameter to retain the collar device on the neck of the pet.

A leash fastener attachment allows connection of a conventional leash to the collar device for restraint and control of the pet. The leash may be left connected to the pet collar device so that only a quick, one-handed operation of engaging the collar device to the neck of the pet is required for use. The pet collar of the present invention eliminates fumbling with small fasteners while attaching the collar to the animal or the leash to the collar. The device is quicker and more convenient than conventional collars and leashes and usable by those with physical or visual impairments which would otherwise prevent use of conventional apparatus. And, the device is small and prevents fatigue or strain on the animal.

BRIEF DESCRIPTION OF THE DRAWINGS

These and other features, aspects and advantages of the present invention will become better understood with regard to the following description, appended claims and accompanying drawings where:

DESCRIPTION OF THE PREFERRED EMBODIMENTS

The following is a description of the preferred embodiments of a pet collar device which allows one-handed engagement or disengagement of a collar from a pet.

Figure 1:
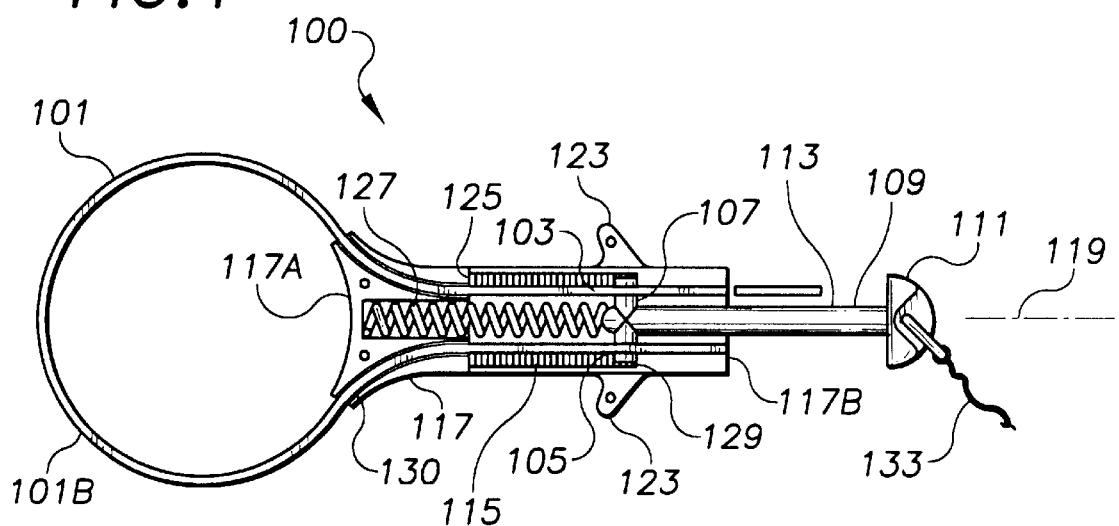
FIG. 1 is a top view of the collar device with the upper portion of the body removed to show the internal parts of the device including the spring biasing the piston of the plunger in the band-retracted (engaged) position.
Figure 2:
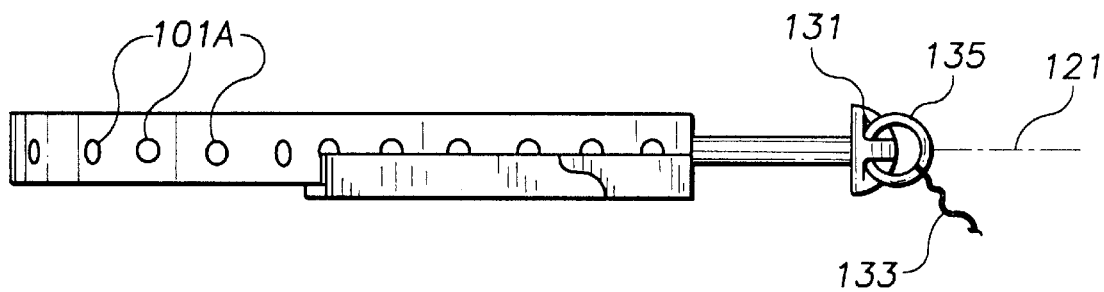
FIG. 2 is a side view of the collar device of FIG. 1 showing the flexible band and piston engagement holes allowing attachment to the piston of the plunger.

FIG. 1 is a top view of the embodiment 100 of the device with the upper portion of the body removed. The collar device comprises a flexible band 101 having a loop portion 101B and end portions 103 and 105 attached to piston 107 of band extension element or reciprocating plunger 109. Piston 107 serves as an attachment point for band end portions 103 and 105 to plunger 109. Piston 107 of plunger 109 is connected to first hand engagement element or knob 111 by shaft 113. Piston 107 slides in piston slot 115 of body 117 to define an axis 119 along which plunger 109 reciprocates. In the preferred embodiments, longitudinal axis 121 (shown in FIG. 2) of plunger 109 is parallel to reciprocating axis 119. In the embodiment shown, axis 121 is coincident with axis 119.

Figure 3:
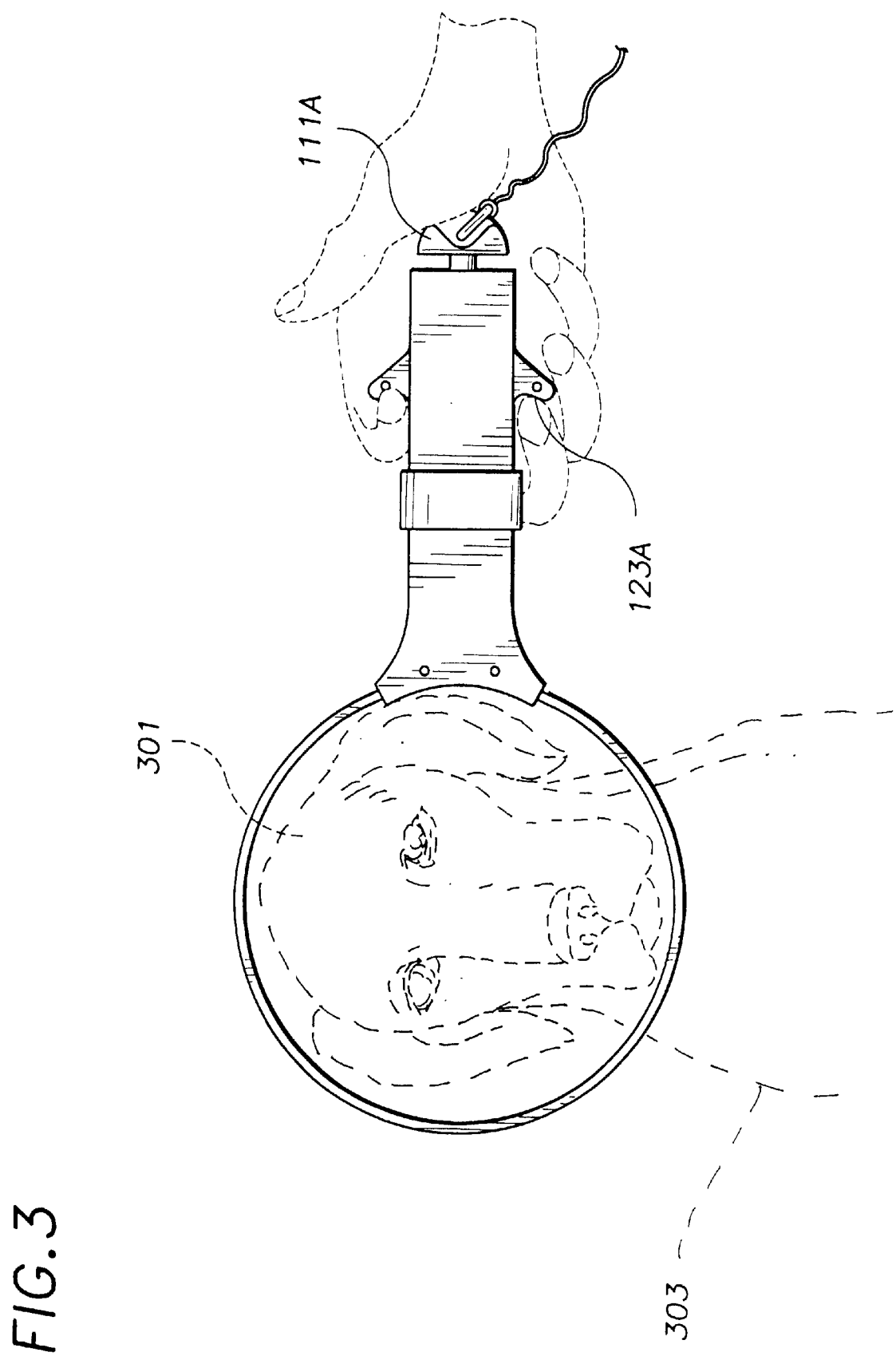
FIG. 3 is a view of the top of the collar device showing the plunger depressed by engagement of the knob of the plunger by the palm of a hand and the fingers of the same hand engaging the finger grips on the body to extend the loop of the flexible band to the band-extended or unengaged position to allow placement of the band loop over the head of an animal.

In the preferred embodiments, finger grips 123 on body 117 and knob 111 of plunger 109 are positioned so that the palm or thumb of a hand can simultaneously engage surface 111A of knob 111 and the fingers of the same hand engage surface 123A of finger grips 123 as shown in FIG. 3. In this way, a single hand can depress plunger 109, extending piston 107 and end portions 103 and 105 of flexible band 101 towards distal end 117A of body 117 and enlarging loop portion 101B of band 101.

Figure 4:
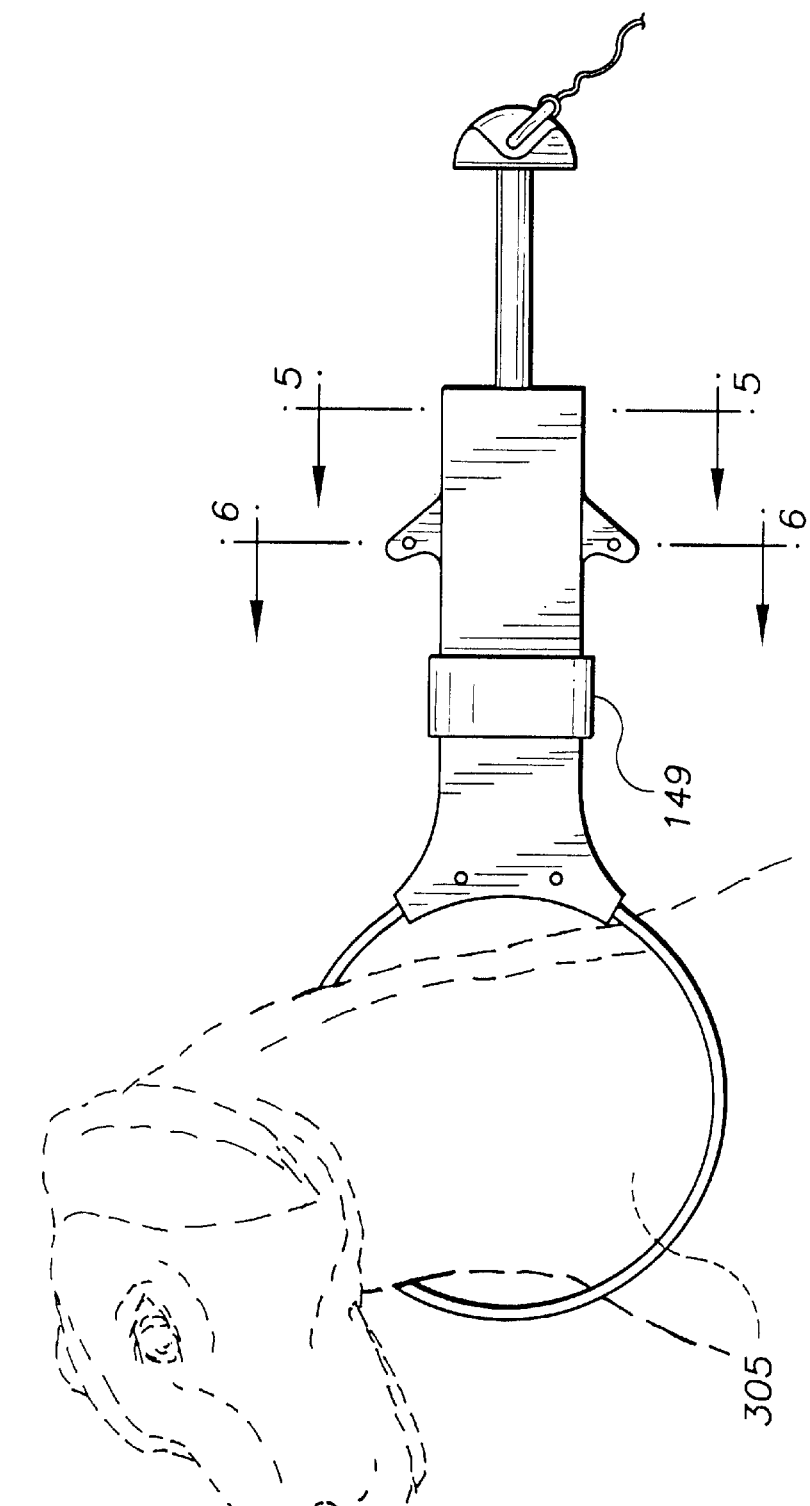
FIG. 4 is a view of the top of the collar device showing the plunger released and in the band-retracted or engaged position resulting from the bias spring biasing the piston of the plunger towards the proximate end of the body and retracting the ends of the flexible band into the body, engaging the loop of the band on the neck of the animal.

Forward end 125 of piston slot 115 acts as a stop at full depression of plunger 109 along axis 119 and defines the band-extended or unengaged position of flexible band 101 as shown in FIG. 3. In the band-extended position, loop 101B can be passed over the head 301 of an animal 303 and positioned over the neck 305 of the animal as shown in FIG. 4. Upon release of knob 111 of plunger 109, a bias element such as helical spring 127 biases piston 107 of plunger 109 toward proximate end 117B of body 117 until it reaches stop 129 of piston slot 115. FIG. 4 shows the band-retracted or engaged position of band 101. In the band-retracted position, band 101 engages the neck 305 of animal 303.

Distal end portion 117A of body 117 forms part of the loop of band 101 between band end portions 103 and 105. In the preferred embodiments, distal end portion 117A is curved as shown in the figure to conform to the neck of the pet and provide a comfortable fit.

Band slots 130 of body 117 provide lateral and transverse support to end portions of flexible band 101 inside body 117, but allow longitudinal motion of the band. In this way, the end portions of band 101 slide longitudinally in slots 130 during motion of plunger 109. In the preferred embodiments, piston 107 has a circular cross section as viewed from the side (transverse to plunger axis 121). Circular piston engagement holes engage the ends of piston 107 to secure end portions 103 and 105 to piston 107. In other embodiments, piston 107 comprises other cross sections such as rectangular, semicircular, or triangular, and band 101 comprises corresponding engagement holes. In still other embodiments, piston 107 is engaged to band 101 by other mechanical fasteners such as clips, or by adhesives.

A leash attachment element such as leash aperture 131 on knob 111 provides a means to attach a leash 133 for providing restraint to the pet. In alternative embodiments, other leash attachment elements such as clips, swivels, eyes, or split rings may be used. Other fastener elements such as split ring 135 facilitates attachment of leash 133 to leash aperture 131 of plunger 111.

Figure 5:
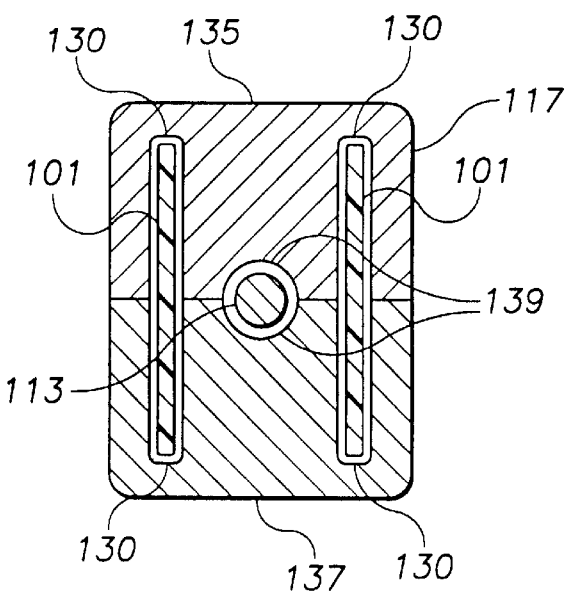
FIG. 5 is a cross section of the device taken along lines 5–5 of FIG. 4.

FIG. 5 is a cross section of the embodiment of FIG. 4 taken at lines 5—5 of FIG. 4. Upper body portion 135 and lower body portion 137 of body 117 comprise band slots 130 slideably supporting flexible band 101. Circular shaft slots 139 of upper and lower body portions 135 and 137 slideably support shaft 113 of plunger 109.

Figure 6:
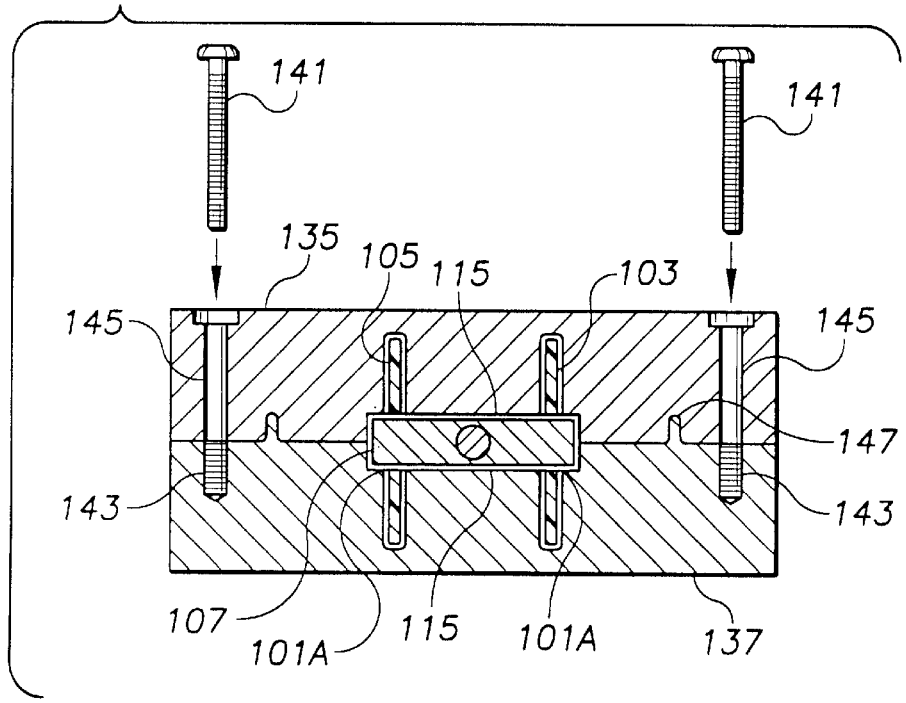
FIG. 6 is a cross section of the device taken along lines 6–6 of FIG. 4.

FIG. 6 is a cross section of the embodiment-of FIG. 4 taken at lines 6—6 of FIG. 4. Piston slot portions I 15 of upper body portion 135 and lower body portion 137 slidably support piston 107. Piston 107 engages holes 101A of band 101 end portions 103 and 105. Fasteners 141 engage threads 143 of fastener holes 145 to fix body portions 135 and 137. Alternatively, alignment pins 147 align portions 135 and 137 and body clip 149 of fig. 4 clamps the body portions together.

Figure 7:
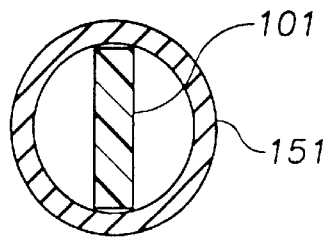
FIG. 7 is a cross-section of an embodiment of a flexible band comprising a sponge rubber tube surrounding a portion of band.

In the preferred embodiments, flexible band 101 is made of a plastic material such as an extruded polyolefin or extruded polyamide. In other embodiments, flexible band 101 is made of metal, such as spring steel, bronze, or stainless steel. In still other embodiments, flexible band 101 is made of a composite material such as plastic-impregnated fabric. Plastic laminated metal bands provide strength and resiliency, and also provide a soft surface that will not cut or abrade the animal's skin. FIG. 7 is a cross-section of yet another embodiment of a flexible band comprising a sponge rubber tube 151 surrounding a portion of band 101. Tube 151 covers only the portion of band 101 which is not enclosed in body 117.

In the preferred embodiments, body 117 is made of plastic, such as injection-molded polyolefins, PVC, PET, or engineered plastics to provide a lightweight device. In other embodiments, body 117 is made of metal. Plunger 107 may be made of metal or plastic. Knob 111 may be made of plastic, wood, metal, rubber, or other materials suitable for the purpose. In one embodiment of the present invention, the proximate end of shaft 113 of plunger 109 may perform the function of a hand engagement element or knob 111. In the preferred embodiments, spring 127 is steel. In other embodiments, other bias elements such as pneumatic piston and cylinder arrangements may be used. In use, upper body portion 135 is removed to allow adjustment of band loop size. Appropriate engagement holes 101A are engaged with piston 107 to provide the desired engagement fit of band 101 around the pet's neck when band 101 is in the band-retracted position of FIG. 4, and yet provide sufficient clearance to fit over the head of the pet when in the band-extended position of FIG. 3. Plunger 109 and band 101 are reassembled in lower body portion 137, and the upper body portion 135 is assembled to lower body portion 137. Band 101 end portions extending from body 117 are cut off as shown in FIG. 1. Body clip 149 provides a means to quickly disassemble and reassemble pet collar device 100.

The length of body 117, plunger 109, and band 101 maybe altered to fit different categories or size groups of pets. The length of piston slot 115 may be altered to provide the necessary difference between the band-extended and band-retracted positions of size groups or classes. For example, it may be preferable to supply three sizes of the pet collar device, one each for the general classes of small, medium and large dogs.

Accordingly, the reader will see that pet collar device provides an improved substitute for a conventional collar and leash. The device provides the following additional advantages:

The collar device may be placed over the head of the pet and engaged at the neck of the animal by a single hand.

The collar device may be used by the elderly and physically or visually impaired persons.

The flexible band of the collar device may be adjusted to fit the pet as it grows, or for use on different animals;

Conventional leashes may be used with the pet collar device;

The collar device is small and light, preventing fatigue of the pet; and

The collar device is simple and low in cost.

Although the description above contains many specifications, these should not be construed as limiting the scope of the invention but merely providing illustrations of some of the presently preferred embodiments of this invention. For example, only one end of the flexible band may be attached to the plunger with the second end attached to the body or housing. Or, a latch may be added to the device to latch the position of the plunger in the band retracted position, the band extended position, or both, to allow locking the collar device on the pet. Thus the scope of the invention should be determined by the appended claims and their legal equivalents, rather than by the examples given.

I claim:

1. A collar device for pets comprising:
    a body;
    a flexible band comprising a first end portion;
    a band extension element operably engaged to the body and attached to the first end portion of the flexible band to define a band loop portion external to the body;
    a first hand engagement surface disposed on the band extension element;
    a second hand engagement surface disposed on the body; and;
    a leash attachment element disposed on the device;
    the first hand engagement surface and the second hand engagement surface disposed on the device so that the first hand engagement surface and the second hand engagement surface are simultaneously engageable and manipulatable by a single hand to position the band extension element and enlarge the band loop portion, allowing one-handed placement of the flexible band over a head of a pet.

2. The collar device of claim 1 wherein a second end portion of the flexible band is attached to the band extension element.

3. The collar device of claim 1 wherein the band extension element is elongated and defines a longitudinal axis and is reciprocally engaged to the body to define a reciprocating axis parallel to the longitudinal axis of the band extension element.

4. The collar device of claim 3 wherein the first end portion and a second end portion of the flexible band are attached to a distal end portion of the band extension element.

5. The collar device of claim 4 wherein the first hand engagement surface is disposed on a proximate end portion of the band extension element, the first hand engagement surface being engageable by a palm or thumb of the single hand.

6. The collar device of claim 5 wherein the band extension element is a reciprocating plunger with a knob attached to a proximate end portion of the plunger.

7. The collar device of claim 5 wherein the second hand engagement surface is a surface portion of a finger grip disposed on the body.

8. The collar device of claim 7 wherein the second hand engagement surface is disposed on two opposing finger grips disposed on the body.

9. The collar device of claim 1 wherein the band extension element is reciprocally supported by the body to define a band-extended position and a band-retracted position, and the device comprises a band retraction element engageable with the band extension element for biasing the band extension element to the band-retracted position.

10. The collar device of claim 9 wherein the band retraction element is a spring disposed in the body, the spring engageable with the band extension element and the body.

11. The collar device of claim 1 wherein the leash attachment element is attached to the band extension element.

12. A collar device for pets comprising:
    a body;
    a flexible band having a first end portion and a second end portion attached to a distal end portion of a reciprocating plunger to define a band loop portion external to a distal end of the body, the plunger reciprocally supported by the body to define a band-extended position and a band-retracted position;
    a hand engagement element disposed on a proximate end portion of the plunger; and
    a finger engagement element disposed on the body; and
    a leash attachment element disposed on -the device;
    the hand engagement element and the finger engagement element disposed relative to each other so that manipulation of the hand engagement element and the finger engagement element by a single hand positions the plunger to the band-extended position allowing one-handed placement of the flexible band over a head of a pet.

13. The collar device of claim 12 comprising a band retraction element disposed in the body, the band retraction element engaging the plunger and the body to bias the plunger in the band-retracted position.

14. The collar device of claim 13 wherein the band retraction element is a helical spring.

15. The collar device of claim 12 wherein the hand engagement element is a knob disposed on the proximate end portion of the plunger, the knob engageable by a palm or a thumb of the single hand while the finger engagement element is engageable by a finger of the single hand.

16. The collar device of claim 12 wherein the plunger comprises a piston fixed to the distal end portion of the plunger and reciprocally supported by the body.

17. The collar device of claim 16 wherein the first end portion and second end portion of the flexible band are attached to the piston.

18. The collar device of claim 17 wherein the body comprises a slot reciprocally supporting the piston.

19. The collar device of claim 18 comprising a helical spring in the body biasing the plunger to the band-retracted position.

20. The collar device of claim 12 wherein the leash attachment element is disposed on the proximate end portion of the plunger.

* * * * *